United States Patent [19]

Bitsch et al.

[11] 4,385,562
[45] May 31, 1983

[54] TRAVELING CRANE WITH TOP GIRDERS AT THE END OF A BRIDGE GIRDER

[75] Inventors: Harald Bitsch, Witten; Klaus Donner, Hagen; Rainer Horbach, Witten; Peter W. Rump, Schwerte, all of Fed. Rep. of Germany

[73] Assignee: Mannesmann Demag AG, Duisburg, Fed. Rep. of Germany

[21] Appl. No.: 136,389

[22] Filed: Apr. 1, 1980

[30] Foreign Application Priority Data

Apr. 4, 1979 [DE] Fed. Rep. of Germany ....... 2913486

[51] Int. Cl.³ .............................................. B66C 6/00
[52] U.S. Cl. ................................ 105/163 R; 403/263; 411/367; 308/180
[58] Field of Search ....................... 105/163; 403/263; 411/366, 367, 368; 308/180

[56] References Cited

FOREIGN PATENT DOCUMENTS

| | | |
|---|---|---|
| 1066818 | 10/1960 | Fed. Rep. of Germany ...... 105/163 |
| 1406307 | 11/1968 | Fed. Rep. of Germany ...... 105/163 |
| 2005949 | 8/1971 | Fed. Rep. of Germany ...... 105/163 |
| 2130171 | 1/1973 | Fed. Rep. of Germany ...... 105/163 |
| 1213950 | 4/1960 | France ................................. 105/163 |
| 1400229 | 4/1965 | France ................................. 105/163 |
| 572438 | 2/1976 | Switzerland ........................ 105/163 |
| 387469 | 2/1933 | United Kingdom ................ 105/163 |
| 621818 | 4/1949 | United Kingdom ................ 105/163 |
| 739350 | 10/1955 | United Kingdom ................ 105/163 |
| 1109111 | 7/1963 | United Kingdom ................ 105/163 |
| 1005800 | 9/1965 | United Kingdom ................ 105/163 |
| 1198162 | 1/1969 | United Kingdom ................ 105/163 |
| 1213286 | 11/1976 | United Kingdom ................ 105/163 |

*Primary Examiner*—Richard A. Bertsch
*Attorney, Agent, or Firm*—Mandeville and Schweitzer

[57] ABSTRACT

The disclosure is directed to the construction of a traveling overhead crane, to enable a desired high degree of precision to be maintained in the attachment of wheel-carrying top girders to the opposite ends of a movable bridge girder. The bridge girder is provided with end plates, to which the respective wheel-carrying top girders are bolted. The end plates are formed with machined annular recesses, surrounding the bolt holes through which the top girders are attached. These machined recesses are so formed that the bottoms thereof constitute a common reference plane. Tubular sleeves of known axial dimension, are received in these recesses and serve to accurately locate the top girders with respect to the predetermined reference plane. The tubular sleeves may in some cases be very short, in the nature of thick washers, for example, or they may be elongated tubes extending through and welded to the top girders. Improved and simplified arrangements are also provided for mounting of the wheels in the top girders.

8 Claims, 6 Drawing Figures

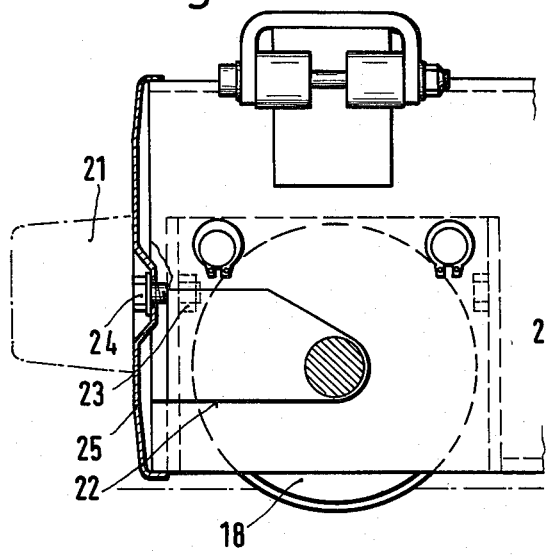
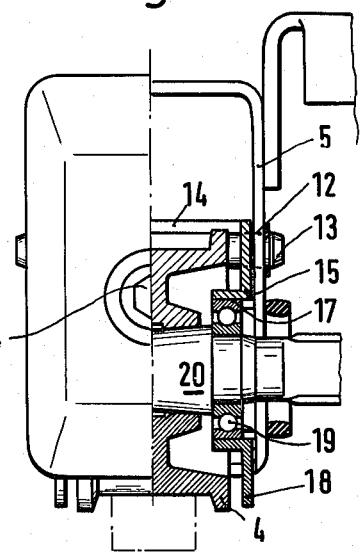
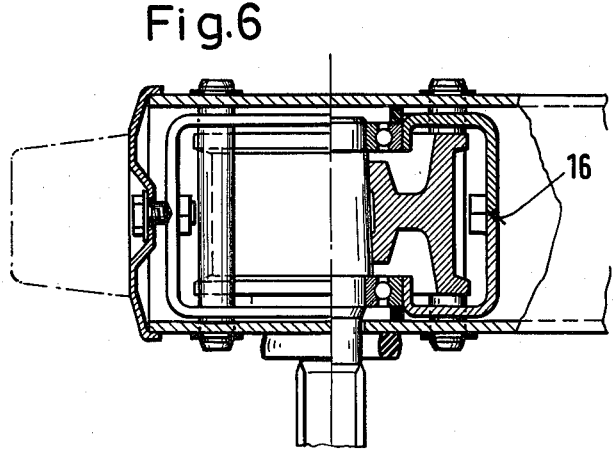

TRAVELING CRANE WITH TOP GIRDERS AT THE END OF A BRIDGE GIRDER

BACKGROUND AND SUMMARY OF THE INVENTION

The invention refers to a traveling crane with end plates located at the ends of a bridge girder, provided with boreholes for screws by means of which top girders provided with carrying wheels are attached to the bridge girder.

Such a traveling crane has been disclosed by French patent application specification No. 1 405 710, having plates welded in the top girder for reinforcement. Bushings are welded to the top girder to accommodate the carrying wheels. As the top girder is not manufactured to close tolerances as an individual part, and furthermore buckles when welding in the plates, a large precision tool is needed to mill the boreholes for the wheel bearings. Th same holds true also for finishing treatments of the end plate of the bridge girder, to which the top girder is attached for precise and aligned arrangement of the carrying wheels.

It is therefore the object of the invention to design a traveling crane so that the bridge girder and the end plates may be finished with minimum expenditure and simple means. This is achieved by surrounding the boreholes with recesses for receiving tubular sleeves or washers receiving the screws, whereby the bottoms of all such recess lie in a common reference plane and all of the tubular sleeves extend to the reference plane. Only the recesses and the tubular sleeves need be of precise dimensions, while the remaining parts may show some unevenness, since they do not touch on account of the tubular sleeves guaranteeing a clearance space between the end plates of the bridge girder and the top girder.

In a further development of the invention, the tubular sleeves may reach through boreholes in both walls of box-shaped top girders and may be attached by welding. In this case the tubular sleeves replace the plates which are otherwise often necessary. During welding of the tubular sleeves the top girder warps less than during the welding of the plates. No special skill is needed for welding the tubular sleeves, as they protrude beyond the walls of the top girder. Before welded to the top girder, the tubular sleeves are placed on an exact appliance, forming the reference plane for centric boreholes in the top girder, through which bolts reach later on to hold carrying wheel bearings in place. Recesses in the top girder may also form a reference plane.

The carrying wheel bearings are, in further development of the invention, made of bracket halves pressed into U-like forms and welded together at weld-on flanges touching one another. Support surfaces for roller bearings are pressed into the bracket walls. Next to the carrying wheel, downward extensions of the bracket walls form a derailment guard by protruding beyond the bottom of the top girder which is provided with a cut-out at the bottom just before its end. The derailment guard becomes effective after a possible wear of the rims.

To permit the drive axle of each motor driven carrying wheel to pass through the lateral wall of the top girder, a slot reaching up to its front end is provided whose upper limit ascends towards the front end. This ascending slot makes it possible to pull the carrying wheel bearing out of the top girder if it needs to be exchanged. To this end, the top girder is slightly raised at first, then the bolts are knocked out and the complete carrying wheel bearing is pulled to the front end and raised since the top girder forms a closed box profile at the front end, and the carrying wheel must be lifted over its lower wall.

When exchanging the carrying wheel, the entire carrying wheel bearing is exchanged since the pertaining parts are joined together in undetachable fashion. For this reason the axle has the shape of a truncated cone in the area of the carrying wheel and pressed into the matching borehole of the carrying wheel, after the parts have been coated with an adhesive over the entire area to be joined. As adhesive Loctite is especially recommended.

In further development of the invention, each carrying wheel may, at the front end of the top girder, be provided with a welded-in nut or with a threaded borehole for the retaining screw of a front plate, whereby the retaining screw may be imbedded in a bumper (cushion?) absorbing shocks from collisions.

Several examples of the invention are shown on the drawings and explained as follows:

DESCRIPTION OF THE DRAWINGS

FIG. 4 is a fragmentary cross sectional view of one top girder end with a power driven carrying wheel of the crane, in profile;

FIG. 5 is a front elevational view of the top girder of FIG. 4;

FIG. 6 is a plan view in section of the top girder of FIG. 4.

DESCRIPTION OF PREFERRED EMBODIMENTS OF THE INVENTION

Figure 1:
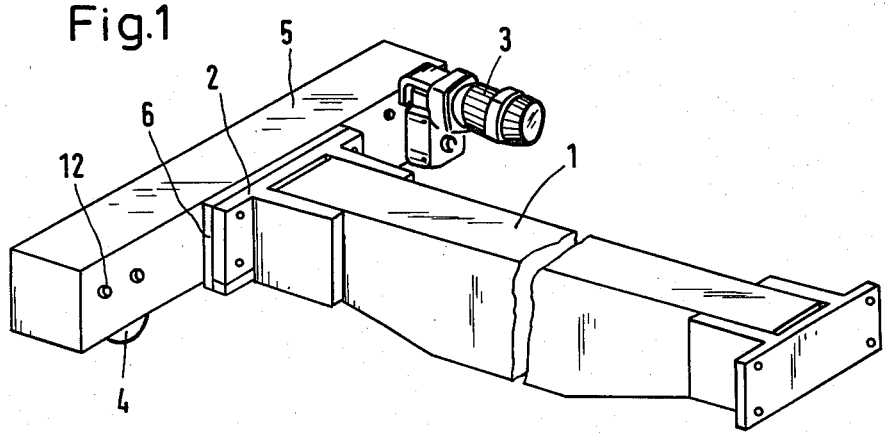
FIG. 1 shows a section of a traveling crane in perspective.

The traveling crane is, at the ends of bridge girder 1, provided with end plates 2 for mounting top girders 5. Carrying wheels 4 are mounted in the ends of the top girder. One of the carrying wheels 4 is coupled with a drive motor 3.

Figure 2:
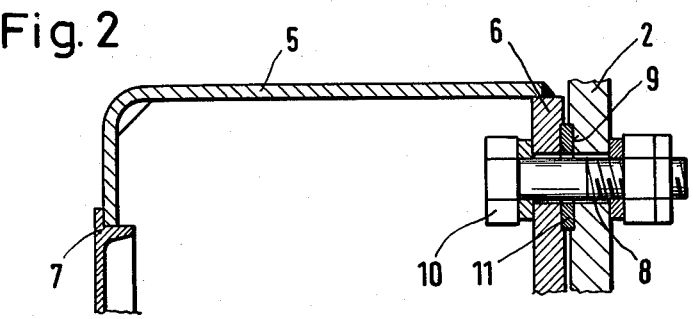
FIGS. 2 and 3 are cross sections through the top girder and the end plate of the bridge girder showing alternative embodiments of the invention.

In the example according to FIGS. 1 and 2 top girder 5 has, in the area of end plate 2 of bridge girder 1, a reinforced front plate 6 and, on the opposite side, an easily removable handhole plate 7 through which screws 10 may be held during assembly. End plate 2 and front plate 6 are provided with boreholes 8 for screws 10 already mentioned, and around these boreholes, recesses 9 for tubular sleeves 11 are provided, the sleeve being sufficiently long that an air gap exists between the plates to compensate for inaccuracies in the plates.

Figure 3:
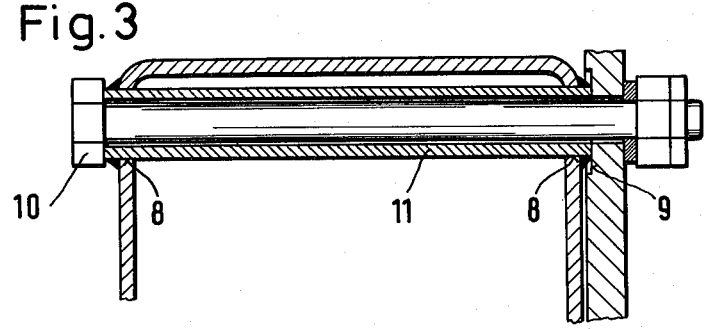

In the example according to FIG. 3, the tubular sleeve 11 is a long tube and protrudes past top girder 5 and rests in an accurately machined recess 9 on the side facing end plate 2.

FIG. 1 shows, at the left end of top girder 5, two boreholes 12 for bolts 13 for the mounting of carrying wheel 14 indicated in FIGS. 4–6. The two bolts 13 constitute the only attachment of carrying wheel 14 in the top girder 5. The carrying wheel bearings are formed by two parts pressed into a U-shape and welded together at weld-on flanges 16; their lateral walls 15 are provided with bearing faces 17 for roller bearing 19 and with wall extensions 18 protruding from the bottom of top girder 5 and serving as derailment guards. The weld-on flanges 16 are provided at the front end with a welded nut 23 for receiving a retaining screw 24, to hold a front plate 25 which completely closes off the front end of the top girder. The screw may also be imbedded in a bumper 21 shown in dot-dash lines which then also holds front plate 25.

Roller bearings 19 for the drive axle 20 of carrying wheel 4, are located at bearing faces 17. The axle 20 reaches into the drive motor 3 discernible in FIG. 1, and pentrates the interior wall of top girder 5 through a slot 22 whose shape, flared on top, may be seen in FIG. 4.

Reference should be made to the following claims in determining the full scope of the invention.

We claim:

1. In a traveling crane of the type including a bridge girder, end plate means secured to the ends of said bridge girder, and top girders mounted to said end plates, the improvement characterized by
    (a) said end plates and top girders formed with bore holes for the reception of connecting elements,
    (b) recesses formed in said end plates, surrounding said bore holes,
    (c) the bottoms of said recesses forming one or more predetermined reference planes,
    (d) tubular spacing sleeves received in said recesses such that one end of said spacing sleeves is flush against said recesses and below the surface of said end plates and serving to locate said top girders in a predetermined relationship to said bridge girder, said spacing sleeves being of greater length than the depth of said recesses formed in said end plates such that an air gap is provided between said end plates of said bridge girder and said top girders, and
    (e) connecting elements received in said bore holes for securing said top girders to said bridge girder.

2. A traveling crane according to claim 1, further characterized by
    (a) said top girder being of box-shaped configuration,
    (b) said tubular sleeves extending through spaced side walls of said top girder, and
    (c) said tubular sleeves being welded to said side walls.

3. In a travelling crane of the type including a bridge girder, end plate means secured to the end of said bridge girder, and top girders mounted to said end plates characterized by
    (a) bearing means located in said top girders for mounting carrying wheels;
    (b) said being means comprising opposed bearing halves, pressed into U-like forms and secured to each other by welding,
    (c) roller bearing races pressed into the opposed walls of said bearing means halves,
    (d) roller bearings received in said roller bearing races,
    (e) said top girders being formed with bore holes for the reception of bearing means connecting elements,
    (f) recesses formed in said top girders surrounding said bore holes,
    (g) the bottom of said recesses forming predetermined in depth reference planes,
    (h) tubular spacing sleeves received in said recesses and serving to locate said bearing means in a predetermined spaced relationship to said top girders, said spacing sleeves being of greater length than the depth of said recesses formed in said top girder such that an air gap is provided between said bearing means and said top girders, and
    (i) connecting elements received in said bore holes for securing said bearing means to said top girder.

4. A travelling crane according to claim 3, further characterized by
    (a) the spaced walls of said bearing means extending below the bottom of said top girders to form derailment guards.

5. A travelling crane according to claim 3, further characterized by
    (a) said top girders being provided with a forwardly opening slot for the reception of the axle of a driven carrying wheel, the said forwardly opening slot having an upwardly and forwardly inclined uper edge to accommodate end-wise removal of said wheel and axle.

6. A travelling crane according to claim 5, further characterized by
    (a) the axle of said driven carrying wheel having the configuration of a truncated cone in the region in which it is received in said driven carrying wheel, and
    (b) said axle shaft being pressed into and adhesively bonded to a correspondingly conically shaped bore hole in said carrying wheel.

7. A travelling crane according to claim 3, further characterized by
    (a) said top girder being provided with a removal cap adjacent said driven carrying wheel, and
    (b) a retaining screw removably securing said cap to one of said top girders and/or said bearing means.

8. A travelling crane according to claim 7, further characterized by
    (a) said retaining screw being imbedded in a bumper.

* * * * *